United States Patent [19]

Naert

[11] Patent Number: 4,712,824
[45] Date of Patent: Dec. 15, 1987

[54] VEHICLE BACK-SEAT

[75] Inventor: Michel S. Naert, Vastra Frolunda, Sweden

[73] Assignee: AB Volvo, Goteborg, Sweden

[21] Appl. No.: 839,023

[22] Filed: Mar. 12, 1986

[30] Foreign Application Priority Data

Mar. 12, 1985 [SE] Sweden ................ 8501225

[51] Int. Cl.⁴ ............................................. B60N 1/10
[52] U.S. Cl. ................................. 296/65 R; 297/383
[58] Field of Search ............... 296/69, 65 R, 37.16; 297/383

[56] References Cited

U.S. PATENT DOCUMENTS 3,473,840 10/1969 Miles ...................................... 296/69
4,198,091 4/1980 Appleton ............................... 296/63
4,200,329 4/1980 Inami et al. ............................ 296/69
4,368,916 1/1983 Blasin ..................................... 297/383
4,484,776 11/1984 Gokimoto et al. ................. 296/65 R Primary Examiner—Robert R. Song
Attorney, Agent, or Firm—Young & Thompson

[57] ABSTRACT

The invention relates to a back-seat in a station wagon. The back-seat has a seat-back which is divided into a lower portion joined to a seat-bottom and an upper portion displaceable relative to the seat-bottom. The upper portion is joined to horizontal rails which engage fixed rails at the sides of the cargo space. The displaceable rails support an upper floor, which when the upper seat-back portion is in a forwardly displaced position forms a forward extension of the cargo space floor.

4 Claims, 2 Drawing Figures

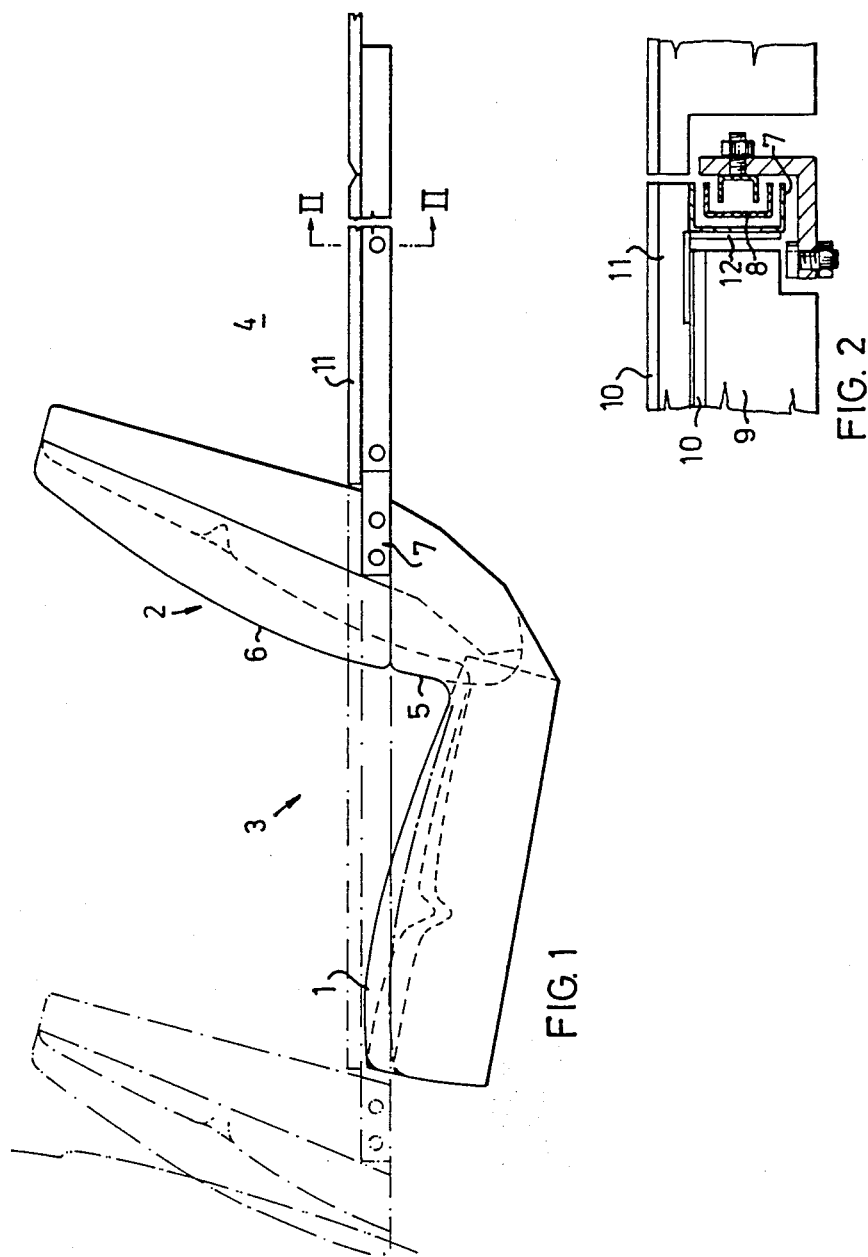

VEHICLE BACK-SEAT

The present invention relates to a back-seat in a vehicle, especially in a so-called station wagon with a cargo space behind the back-seat, comprising a seat-bottom and a seat-back.

Back-seats in station wagons are virtually without exception foldable in one manner or another to make possible a forward extension of the cargo space created. In a common type, the seat-bottom is hinged at its forward edge and the seat-back is hinged at its lower edge. When the cargo space is to be extended, the seat-bottom is tipped up to a vertical position against the rear surface of the seat-back of the front-seat and the seat-back of the back-seat is then folded forward to a horizontal position. This design has, however, several disadvantages. On the one hand, the seat-back of the back-seat cannot be provided with conventional fixed head rests and, on the other hand, it limits the range of adjustment for the inclination of the seat-back of the front-seat, which must be set relatively vertically, which is considered by most to be relatively uncomfortable.

The purpose of the present invention is to provide a convertible back-seat for a station wagon which permits the use of fixed head rests and does not limit the possibility to adjust the seat-back of the front-seat for optimum comfort.

This is achieved according to the invention by at least a portion of the seat-back being moulded for horizontal displacement relative to the seat-bottom between a rear normal position and a forward position in which the displaceable seat-back portion is situated at or in the vicinity of the forward edge of the seat-bottom. In addition to the above-mentioned advantages, the design according to the invention has the advantage that the conversion can be performed with fewer manipulations than with previously known designs.

The invention will be described in more detail below with reference to an example shown in the accompanying drawing, where FIG. 1 shows a schematic side view of a seat according to the invention, and FIG. 2 shows a section along the line II—II in FIG. 1.

In FIG. 1, 1 designates the seat-bottom and 2 the seat-back of a back-seat 3 in a station wagon, where the space 4 behind the seat-back forms a cargo space in a conventional manner, which space can be extended forward. In contrast to the usual back-seats in station wagon, the seat-bottom 1 is permanently fixed in the vehicle, while the seat-back 2 is divided into a lower portion 5 permanently joined to the seat-bottom and an upper portion 6, the frame of which is joined at opposite sides to rails 7 which are engaged with fixed rails 8 on the sides of the cargo space.

In FIG. 2, 9 designates the existing floor with carpet 10. On top of this is a plate 11 joined to the rail 7 by means of angle irons 12 welded thereto. The plate 11 thus forms an upper floor joined to the upper seat-back portion 6, and in the position shown in FIG. 1 with solid lines, it overlaps the ordinary floor of the cargo space.

When the cargo space is to be extended forward, a catch (not shown) is first released, for example spring bolts carried by the movable rails 7, which bolts in the locking position extend into openings in the fixed rails. The upper seat back portion 6 is then pushed forward to the position shown with dash/dot lines in FIG. 1 into contact with the seat-back 13 of the front-seat. The upper floor 11 now covers the seat bottom 1 and forms a forward extension of the ordinary floor.

As can be seen in FIG. 1 the forward portion of the seat-bottom sticks up above the level of the underside of the rail 7 and the upper seat-back portion. When the seat-bottom 1 is, as in the example shown, permanently fixed, the cushion must be compressed somewhat, as indicated in FIG. 1. In an alternative embodiment (not shown), the front portion of the seat-bottom can be lowerable to eliminate the need to compress the cushion.

The upper seat-back portion can be provided with a number of alternative forward locking positions by means of the locking mechanism (not shown) to increase the cargo space to a maximum with the seat-back of the front-seat in a virtually vertical position or alternatively to have a more limited extension of the cargo space, preserving the possibility of adjusting the seat-back of the front-seat for optimum comfort.

I claim:

1. Back-seat in a vehicle, especially in a so-called station wagon with a cargo space behind the back-seat, comprising a seat-bottom and a seat-back, characterized in that at least an upper portion of the seat-back is mounted for horizontal discplacement in an upright position relative to the seat-bottom between a rear normal upright position and a forward upright position in which the displaceable seat-back portion is situated at or in the vicinity of the forward edge of the seat-bottom.

2. Seat according to claim 1, characterized in that the seat-back comprises a lower portion joined to the seat-bottom and an upper portion mounted in longitudinal guides.

3. Seat according to claim 1, characterized in that the displaceable seat-back portion is joined to a cargo carrying floor disposed behind the seat-back portion and displaceable therewith, which floor, when the seat-back portion is in its rear position, is disposed on top of the ordinary floor of the cargo space.

4. Seat according to claim 1, characterized in that the displaceable seat-back portion is solidly joined at its opposite sides with longitudinal rails each of which engage an individual fixed rail at opposite longitudinal sides of the cargo space.

* * * * *